(12) United States Patent
Botura et al.

(10) Patent No.: US 10,875,632 B2
(45) Date of Patent: Dec. 29, 2020

(54) ICE PHOBIC MATERIAL TO REDUCE RUNBACK ICE

(71) Applicant: Goodrich Corporation, Charlotte, NC (US)

(72) Inventors: Galdemir Cezar Botura, Akron, OH (US); Jin Hu, Hudson, OH (US)

(73) Assignee: Goodrich Corporation, Charlotte, NC (US)

(*) Notice: Subject to any disclaimer, the term of this patent is extended or adjusted under 35 U.S.C. 154(b) by 437 days.

(21) Appl. No.: 15/806,516

(22) Filed: Nov. 8, 2017

(65) Prior Publication Data

US 2019/0135443 A1   May 9, 2019

(51) Int. Cl.

| | |
|---|---|
| *B64D 15/12* | (2006.01) |
| *B64D 15/00* | (2006.01) |
| *F01D 25/02* | (2006.01) |
| *F02C 7/047* | (2006.01) |
| *B64C 15/12* | (2006.01) |

(52) U.S. Cl.
CPC ............ *B64C 15/12* (2013.01); *B64D 15/00* (2013.01); *F01D 25/02* (2013.01); *F02C 7/047* (2013.01); *F05D 2240/121* (2013.01); *F05D 2240/124* (2013.01); *F05D 2240/303* (2013.01); *F05D 2240/306* (2013.01); *F05D 2300/512* (2013.01)

(58) Field of Classification Search
CPC ........ B64D 15/12; B64D 15/10; B64D 15/14; B64D 2033/0233
See application file for complete search history.

(56) References Cited

U.S. PATENT DOCUMENTS

| | | | |
|---|---|---|---|
| 6,102,333 A | 8/2000 | Gerardi et al. | |
| 2014/0131520 A1* | 5/2014 | Boone | B64D 15/12 244/134 D |
| 2015/0129720 A1 | 5/2015 | Strobl et al. | |
| 2015/0183530 A1* | 7/2015 | Strobl | H01L 41/313 29/428 |
| 2015/0251767 A1* | 9/2015 | Sapper | C09K 3/18 244/134 E |
| 2015/0299503 A1* | 10/2015 | Carter | B64D 15/08 156/182 |
| 2016/0114883 A1 | 4/2016 | Guerry et al. | |
| 2018/0009538 A1* | 1/2018 | Wilson | B64C 1/1476 |

(Continued)

FOREIGN PATENT DOCUMENTS

| | | |
|---|---|---|
| EP | 2915747 A1 | 9/2015 |
| EP | 3115299 A1 | 1/2017 |
| EP | 3020638 B1 | 7/2017 |

(Continued)

OTHER PUBLICATIONS

Taylor Dayton Knuth, Ice Adhesion Strength Modeling Based on Surface Morphology Variations, Jul. 14, 2015, https://etda.libraries.psu.edu/catalog/26526 (Year: 2015).*

(Continued)

*Primary Examiner* — Richard R. Green
*Assistant Examiner* — William L Gmoser
(74) *Attorney, Agent, or Firm* — Kinney & Lange, P. A.

(57) ABSTRACT

An ice protection assembly on an airfoil includes a heater positioned on the leading edge, and one or more ice phobic layers positioned to inhibit runback ice formation on the surface of the airfoil downstream of the heater.

9 Claims, 5 Drawing Sheets

(56) References Cited

U.S. PATENT DOCUMENTS

2018/0029699 A1* 2/2018 Nissen .................. B64C 27/473
2019/0112980 A1* 4/2019 Sutterfield ............. B64D 15/04

FOREIGN PATENT DOCUMENTS

| JP | 2010234989 A | 10/2010 |
|----|--------------|---------|
| WO | WO2017162862 A1 | 9/2017 |
| WO | WO2017172409 A1 | 10/2017 |

OTHER PUBLICATIONS

Extended European Search Report for EP Application No. 18205118.5, dated Feb. 4, 2019, pp. 8.
Communication Pursuant to Article 94(3) EPC for EP Application No. 18205118.5, dated Apr. 21, 2020, pp. 4.

* cited by examiner

ICE PHOBIC MATERIAL TO REDUCE RUNBACK ICE

BACKGROUND

This application relates generally to aircraft safety and specifically to ice protection on aircraft.

An aircraft moving through the air or clouds is subjected to ice formation. Under some ice conditions, ice accumulates rapidly on leading edge surfaces. In this case, smooth airflow is destroyed, decreasing lift and increasing drag. In particular, runback ice can form on aircraft where ice forms from freezing or refreezing of water leaving heated or protected surfaces and running back to unprotected surfaces. Runback ice can be particularly problematic and detrimentally affect flight when ice forms on unheated or unprotected surfaces.

SUMMARY

In one embodiment, an ice protection assembly for aircraft, the ice protection assembly including an airfoil comprising a leading edge and a trailing edge, a heater mounted on the airfoil nearer the leading edge than the trailing edge, and an ice phobic layer attached to the airfoil proximate the heater.

In another embodiment, an ice protection assembly includes a heater configured to melt ice on an external surface of an aircraft, and an ice phobic layer positioned proximate the heater, the ice phobic layer configured to prevent runback ice formation.

In a third embodiment, a method of preventing runback ice includes melting ice on an external surface of an aircraft into water with a heater, and running the water across a portion of the external surface downstream of the heater, the portion of the external surface containing an ice phobic layer configured to prevent runback ice formation.

DETAILED DESCRIPTION

Figure 1A:
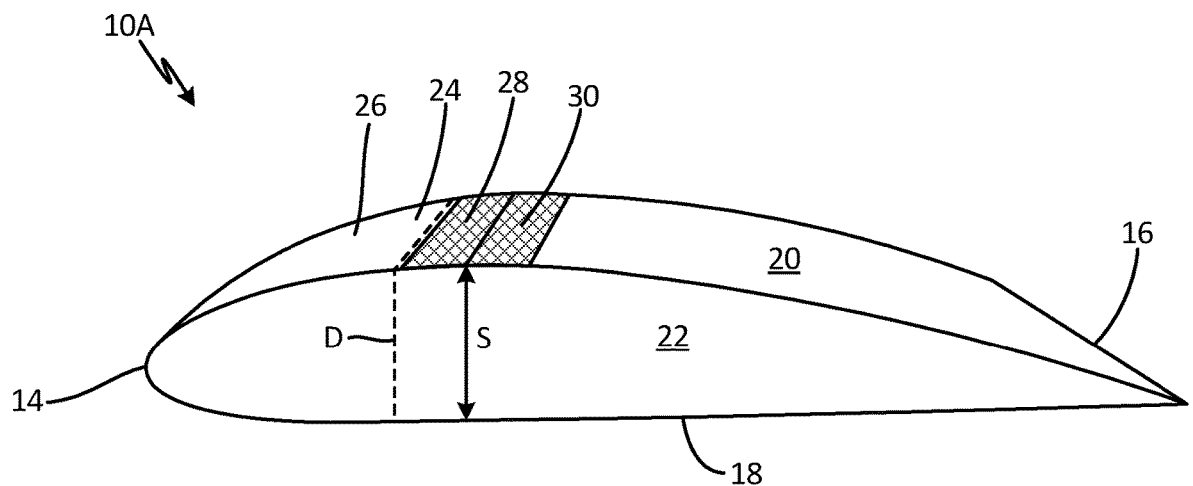
FIGS. 1A-1G are perspective views of airfoils with an applied ice phobic material.

Runback ice forms when liquid water moves aft on an upper surface of a wing (or other aircraft part) beyond a heated impingement area. This can be addressed by applying ice phobic material (e.g., low adhesion material on which ice will not form, or where ice adhesion strength is significant reduced) to areas downstream of the heated impingement area on the aircraft. Thus, water film running from the heated impingement area will not refreeze in the downstream area.

FIGS. 1A-1G are perspective views of airfoils 10A-10G with an applied ice phobic material. Each of airfoils 10A-10G has leading edge 14, trailing edge 16, first surface 18, second surface 20, side 22, and ice protected zone 24. Airfoils 10A-10G also contain ice phobic layers, such as layers 28, 30, 32, and 34. Airfoils 10A-10G depict embodiments of the airfoil with different combinations of ice phobic layers 28, 30, 32, and 34.

Leading edge 14 is the part of the airfoil that first contacts air, or the foremost part of the airfoil. Leading edge 14 and trailing edge 16 are located on opposite ends of the airfoil, with surfaces 18, 20, and side 22 between. Each airfoil 10A-10G also contains spar S, which is a structural member that extends spanwise across the width of the airfoil from first surface 18 to second surface 20 at the largest height of the airfoil. Spar S spans within airfoil 10 to provide structure support.

Ice protected zone 24 is located near leading edge 14, and ends at the dashed line D indicated on each airfoil 10A-10G. Ice protected zone 24 typically contains heater 26. Heater 26 is an electrothermal heater configured to melt ice that accumulates on or near leading edge 14 of the airfoil. Heater 26 can be a metallic, carbon nanotube, or other suitable heater for ice protection. Heater 26 melts ice into water inside ice protected zone 24. Water from ice protected zone typically runs from ice protected zone 24 down second surface 20 toward trailing edge 16. This "runback" water can freeze downstream of ice protected zone 24, causing runback ice to form on the airfoil.

FIG. 1A shows airfoil 10A with ice phobic layers 28 and 30. Ice phobic layers 28 and 30 are comprised of a material with a low ice adhesion, at least below 200 psi (pounds per square inch), preferably below 100 psi, and typically below 45 psi. Layers 28 and 30 can be made of a low ice adhesion material such as multiscale crack initiator promoted super-low ice adhesion surfaces, Slippery Liquid-Infused Nano-structured Surfaces (SLIPS), HygraTek®, HybridShield® by NanoSonic ice phobic coatings, PPG IcePhobic Coating, NANOMYTE® SuperAi by NEI Corporation, or other materials/coatings with low ice adhesion.

In airfoil 10A, ice phobic layer 28 is located on surface 20 between ice protected zone 24 and spar S. Ice phobic layer 30 is located next to ice phobic layer 28, downstream of spar S in the direction of trailing edge 16. Ice phobic layers 28, 30, "catch" water running back from ice protected zone 24 and heater 26. When water runs across ice phobic layers 28 and 30, the water does not turn to ice due to the low ice adhesion of ice phobic layers 28 and 30. Thus, water runs along layers 28 and 30 towards trailing edge 16, and does not freeze into runback ice near leading edge 14.

Figure 1B:
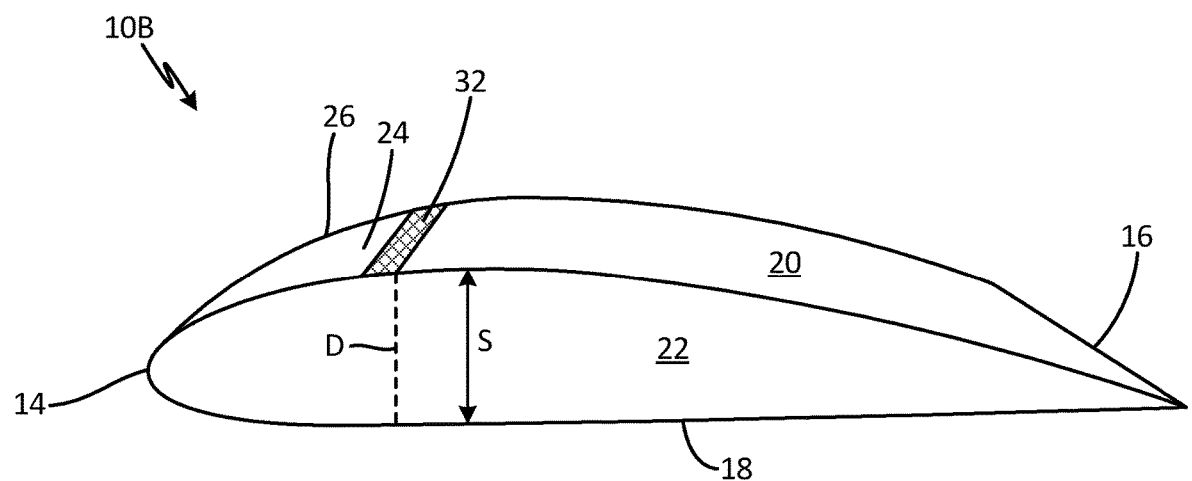

FIG. 1B shows airfoil 10B with ice phobic layer 32. Ice phobic layer 32 resides inside ice protected zone 24, opposite leading edge 14. Thus, ice phobic layer 32 works in conjunction with heater 26 to melt ice and prevent refreezing. Thus reduces the energy that heater 26 requires to run. Low ice adhesion on ice phobic layer 32 in ice protected zone 24 allows for removal of ice by electrical and mechanical means with lower energy as melted water is directed towards trailing edge 16.

Figure 1C:
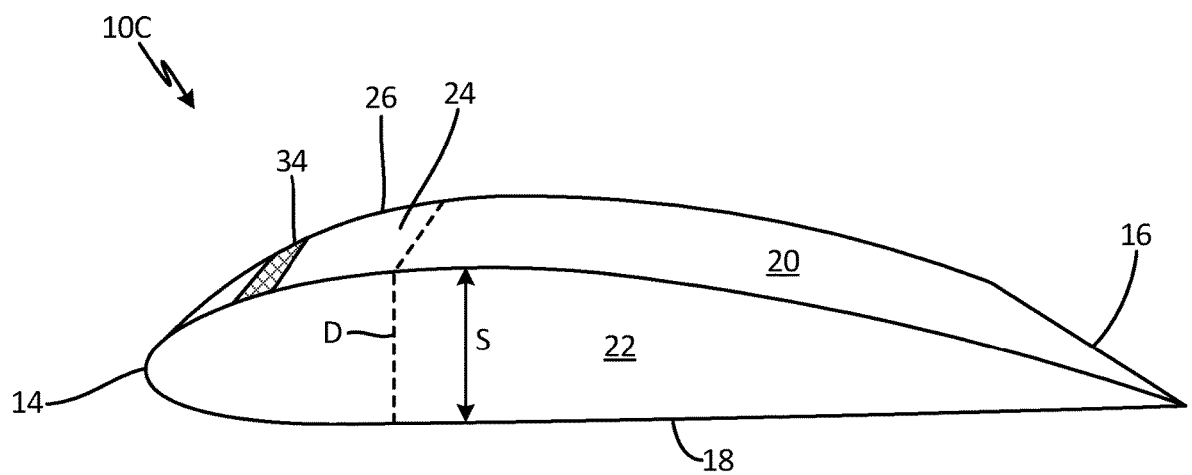

FIG. 1C shows airfoil 10C with ice phobic layer 34 positioned near leading edge 14, overlaying ice protected zone 24. This positioning further decreases the energy required for heater 26 to melt ice into water, and prevents ice formation within zone 24. Ice phobic layer 34 is located in a stagnation travel area, wherein a high concentration of ice could otherwise build up.

Figure 1D:
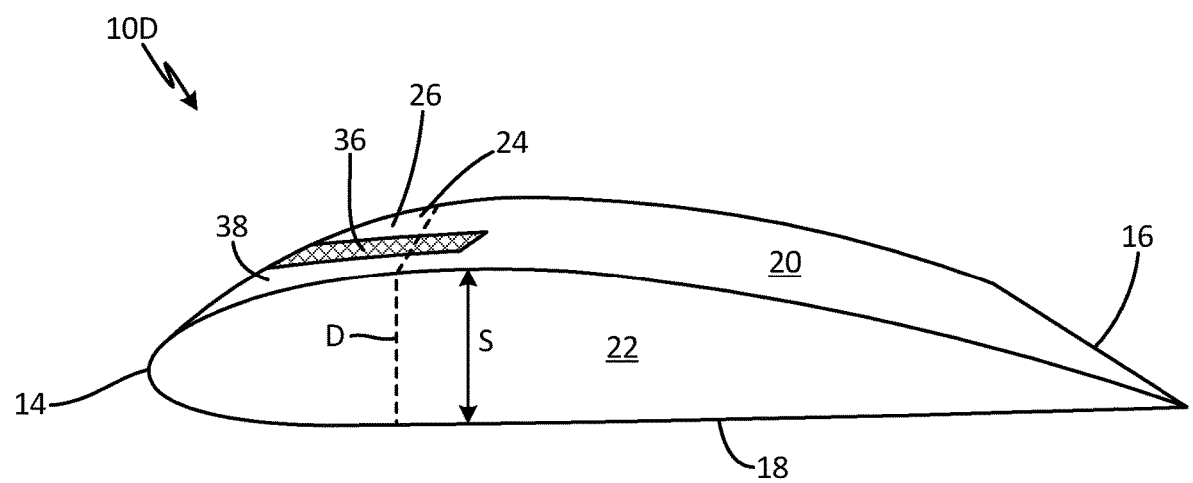

FIG. 1D depicts airfoil 10D with ice phobic layer 34 in a strip form. Ice protected zone 24 on airfoil 10D contains two heaters 26 and 38. Heaters 26 and 38 are connected by ice phobic layer 34. Thus, ice phobic layer 34 acts as a joint between two heaters 26 and 38. This allows for low ice adhesion where multiple heaters are joined within ice protected zone 24. Similar to airfoils 10B and 10C, ice phobic layer 34 located within ice protected zone 24 also reduces the energy required for heaters 26, 38 to melt ice and protect leading edge 14 of airfoil 10D.

Figure 1E:
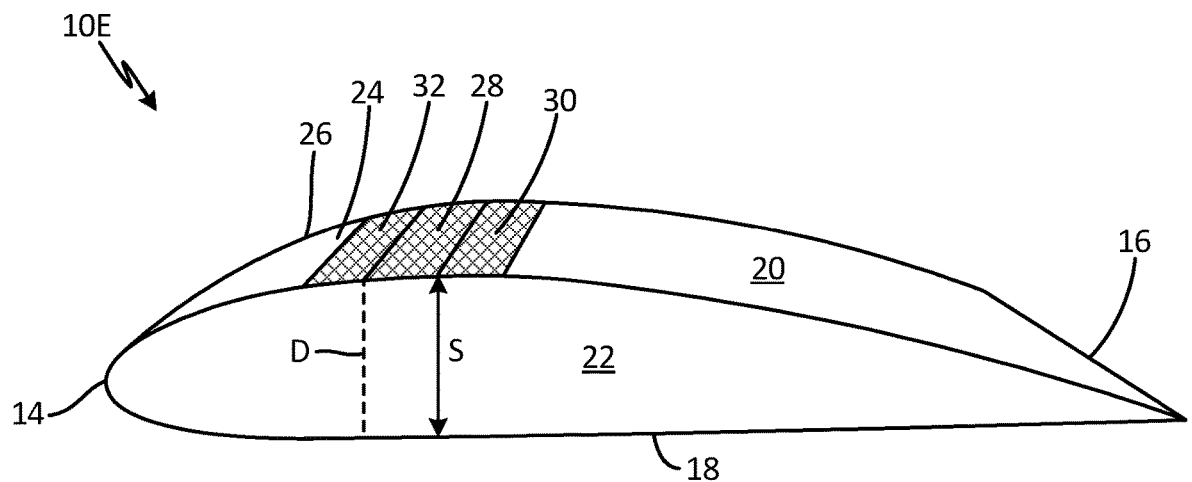
Figure 1F:
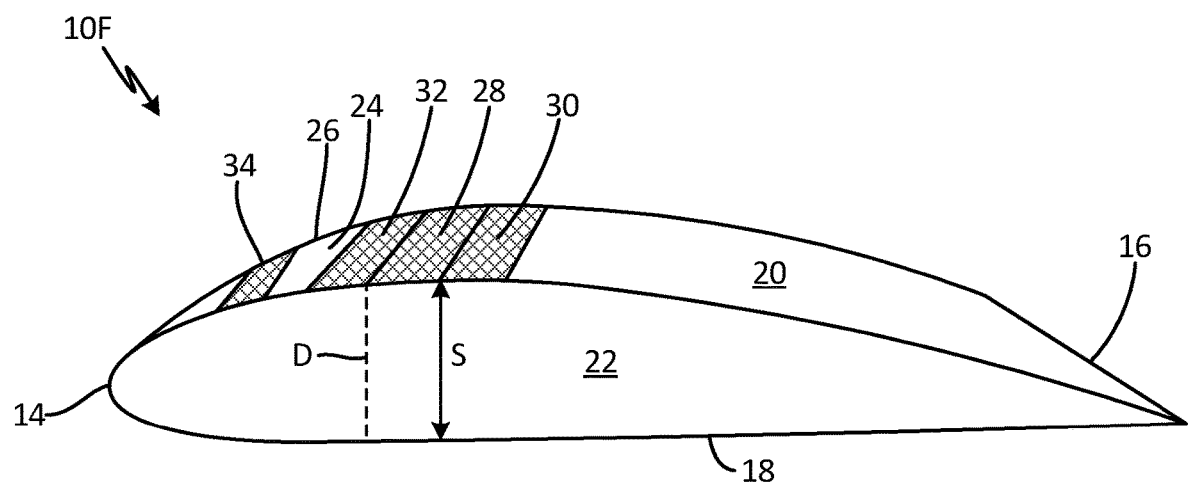
Figure 1G:
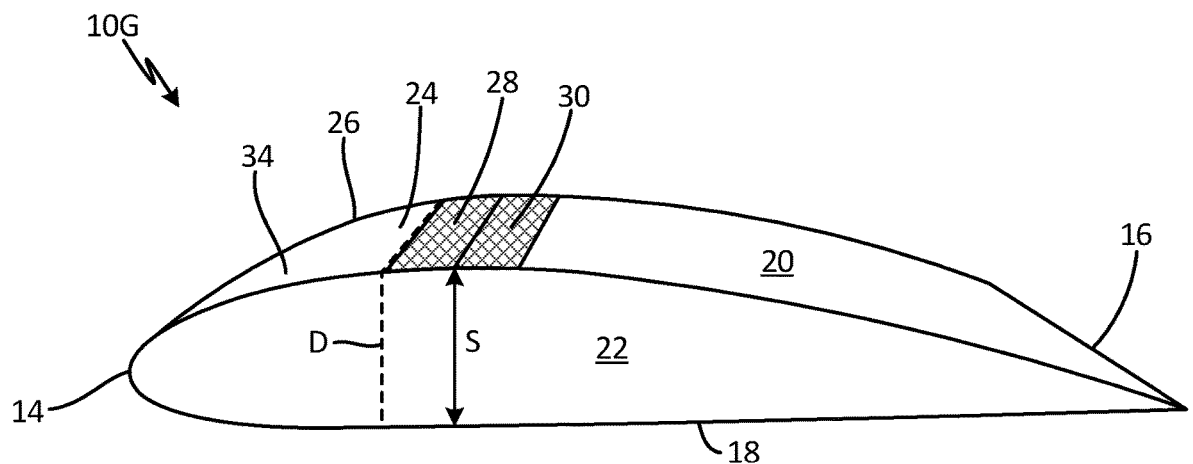

FIGS. 1E, 1F, and 1G shown airfoils 10E, 10F, and 10G, which are combinations of previous airfoils and ice phobic layers 28, 30, 32, and 34. FIG. 1E shows airfoil 10E with ice phobic layers 28, 30, and 32. Thus, surface 20 of airfoil 10E contains ice phobic layers both in ice protected zone 24 and downstream of zone 24, extending across the spar. FIG. 1F shows airfoil 10F with ice phobic layers 28, 30, 32, and 34. Layer 34 adds extra low adhesion material in zone 24 near leading edge 14. FIG. 1G shows airfoil 10G with ice phobic layers 28, 30, and 34. This allows water to run across zone 24 to ice phobic layers 28, 30.

Figure 2:
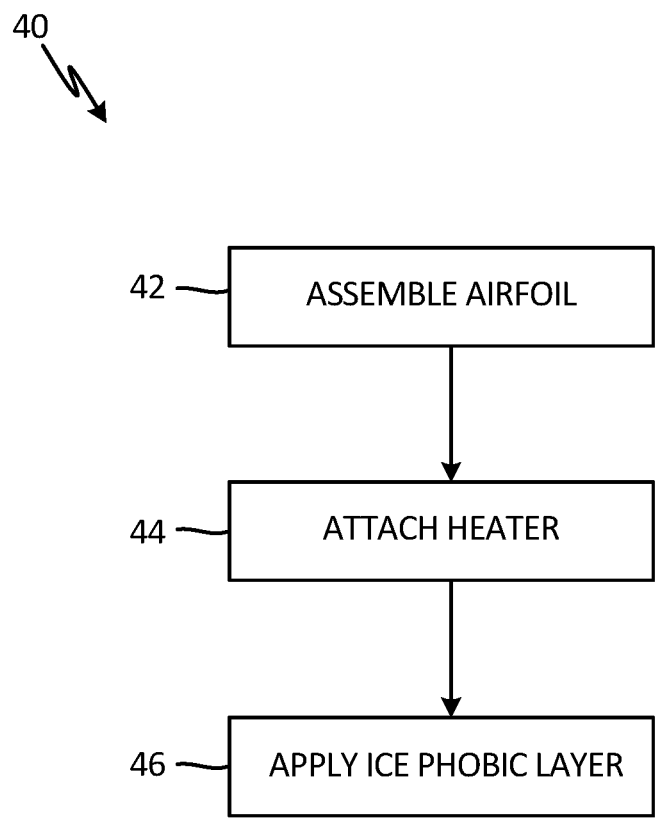
FIG. 2 is a flowchart depicting a method of making an airfoil with an applied ice phobic material.

FIG. 2 is a flowchart depicting a method of making an airfoil with an applied ice phobic material. Method 40 includes assembling the airfoil (step 42), attaching an ice protection system (step 44) and applying the ice phobic material (step 46).

Step 42 can be accomplished by normal manufacturing methods. Typically, the leading edge of an airfoil will be assembled prior to application of a heater (or other ice protection system) and an ice phobic layer. In step 44, a heater (or other ice protection system) is applied to the airfoil near the leading edge. The heater can be a metallic or carbon allotrope based heater, or other appropriate mechanical, electrical, or thermal assembly for ice protection.

In step 46, the ice phobic layer is attached to the airfoil. This can be done by spraying the ice phobic material onto the desire surface of the airfoil, or by brushing, coating, painting, or other means. Alternatively, an ice phobic material can be applied to the leading edge as a sheet or attached by a film adhesive, depending on the specific ice phobic material. In another method, the ice phobic material can be applied to the leading edge during manufacturing of the airfoil by embedding a composite ice phobic material on the appropriate surface. Optionally, the ice phobic material can be cured or finished as needed.

The proposed airfoil assembly with ice phobic material allows for prevention of runback ice formation on airfoil surfaces both near the leading edge, and downstream. Less runback ice on an airfoil prevents drag and lift issues associated with ice formation. Additionally, if the ice phobic material is used in conjunction with a heater (or other ice protection system), the energy required to run the heater is decreased. This allows for higher efficiency ice protection overall.

Discussion of Possible Embodiments

The following are non-exclusive descriptions of possible embodiments of the present invention.

An ice protection assembly for aircraft, the ice protection assembly including an airfoil comprising a leading edge and a trailing edge, a heater mounted on the airfoil nearer the leading edge than the trailing edge, and an ice phobic layer attached to the airfoil proximate the heater.

The assembly of the preceding paragraph can optionally include, additionally and/or alternatively, any one or more of the following features, configurations and/or additional components:

The ice phobic layer is attached to the airfoil downstream of the heater.

The ice phobic layer is attached to the airfoil overlaying the heater.

The ice protection assembly includes a second heater attached to the airfoil.

The ice phobic layer is attached to the airfoil between the first heater and the second heater such that the ice phobic layer joins the first heater and the second heater.

The ice phobic layer is attached to the airfoil on the leading edge.

The ice phobic layer is attached on the first surface across a main spar.

The ice phobic material has an ice adhesion of less than 200 psi.

The ice phobic material has an ice adhesion of less than 100 psi.

The ice phobic material has an ice adhesion of less than 45 psi.

An ice protection assembly includes a heater configured to melt ice on an external surface of an aircraft, and an ice phobic layer positioned proximate the heater, the ice phobic layer configured to prevent runback ice formation.

The assembly of the preceding paragraph can optionally include, additionally and/or alternatively, any one or more of the following features, configurations and/or additional components:

The ice phobic layer is positioned downstream of the heater.

The ice phobic layer is overlays the heater.

The ice protection assembly includes a second heater configured to melt ice.

The ice phobic layer joins the heater and the second heater.

A method of preventing runback ice includes melting ice on an external surface of an aircraft into water with a heater, and running the water across a portion of the external surface downstream of the heater, the portion of the external surface containing an ice phobic layer configured to prevent runback ice formation.

The method of the preceding paragraph can optionally include, additionally and/or alternatively, any one or more of the following features, configurations and/or additional components:

The ice phobic layer overlaps with the heater.

The ice phobic material has an ice adhesion of less than 200 psi.

The external surface is an airfoil, a radome, a structural fairing, an engine part, or a nacelle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An ice protection assembly for aircraft, the ice protection assembly comprising:
   an airfoil comprising:
      a leading edge;
      a trailing edge;
      a first surface;
      a second surface;
      a spar extending spanwise across a width of the airfoil from the first surface to the second surface at a largest height of the airfoil, wherein the spar is configured to provide structural support to the airfoil; and
      an ice protected zone extending from the leading edge to a line upstream of the spar;

a heater mounted on the airfoil in the ice protected zone and configured to melt ice that accumulates on or near the leading edge when in operation thereby forming liquid water;

and at least one ice phobic layer attached to the airfoil and positioned on the second surface entirely downstream of the ice protected zone, wherein the at least one ice phobic layer is positioned to prevent liquid water flowing across the airfoil from refreezing downstream of the ice protected zone when the heater is in operation.

2. The ice protection assembly of claim 1, wherein the ice phobic layer is attached on the second surface across the spar.

3. The ice protection assembly of claim 1, wherein the ice phobic material has an ice adhesion of less than 200 psi.

4. The ice protection assembly of claim 3, wherein the ice phobic material has an ice adhesion of less than 100 psi.

5. The ice protection assembly of claim 4, wherein the ice phobic material has an ice adhesion of less than 45 psi.

6. A method of preventing runback ice comprising:
melting ice that accumulates on or near a leading edge of an external surface of an aircraft into water with a heater, wherein the heater is in an ice protected zone that extends on the external surface downstream of the heater and the external surface is an airfoil; and
running the water across a portion of the external surface downstream of the heater, the portion of the external surface containing at least one ice phobic layer configured to prevent runback ice formation, wherein the at least one ice phobic layer is positioned entirely downstream of the ice protected zone.

7. The method of claim 6, wherein the ice phobic material has an ice adhesion of less than 200 psi.

8. The ice protection assembly of claim 1, further comprising a second ice phobic layer positioned on the second surface adjacent to the at least one ice phobic layer and downstream of the spar in the direction of the trailing edge.

9. The ice protection assembly of claim 8, further comprising a third ice phobic layer positioned on the second surface in the ice protected zone adjacent to the at least one ice phobic layer.

\* \* \* \* \*